United States Patent [19]

Muryoi

[11] 4,439,019
[45] Mar. 27, 1984

[54] ZOOM LENS BARREL WITH SINGLE-RING CONTINUOUS FOCUSING

[75] Inventor: Takeshi Muryoi, Chigasaki, Japan

[73] Assignee: Nippon Kogaku K.K., Tokyo, Japan

[21] Appl. No.: 308,182

[22] Filed: Oct. 2, 1981

[30] Foreign Application Priority Data

Oct. 11, 1980 [JP] Japan ................. 55-1442265

[51] Int. Cl.³ ............................... G02B 7/10
[52] U.S. Cl. ................... 350/430; 350/255; 350/429
[58] Field of Search ............... 350/429, 430, 255

[56] References Cited

U.S. PATENT DOCUMENTS

| | | | |
|---|---|---|---|
| 3,784,285 | 1/1974 | Watahabe et al. | 350/430 |
| 4,154,511 | 5/1979 | Maekawa | 350/255 |
| 4,175,831 | 11/1979 | Ito | 350/429 |
| 4,193,667 | 3/1980 | Yasukuni et al. | 350/429 |
| 4,266,860 | 5/1981 | Hayashi | 350/426 |
| 4,273,423 | 6/1981 | Vesugi | 350/429 |
| 4,286,845 | 9/1981 | Kamata | 350/430 |
| 4,309,076 | 1/1982 | Ito | 350/255 |
| 4,318,593 | 3/1982 | Tsuji et al. | 350/430 |

Primary Examiner—Jon W. Henry
Attorney, Agent, or Firm—Shapiro and Shapiro

[57] ABSTRACT

A zoom lens barrel includes an optical system including a forward group lens and a rearward group lens, the forward group lens comprising a first lens group and a second lens group, and means for driving the forward group lens in the direction of the optical axis for focusing. The driving means includes an operating member, a first holding member holding the first lens group and movable in the direction of the optical axis in response to the operating member, a second holding member holding the second lens group and movable in the direction of the optical axis, and means responsive to movement of the first holding member to move the second holding member while varying the spacing between the first lens group and the second lens group.

4 Claims, 1 Drawing Figure

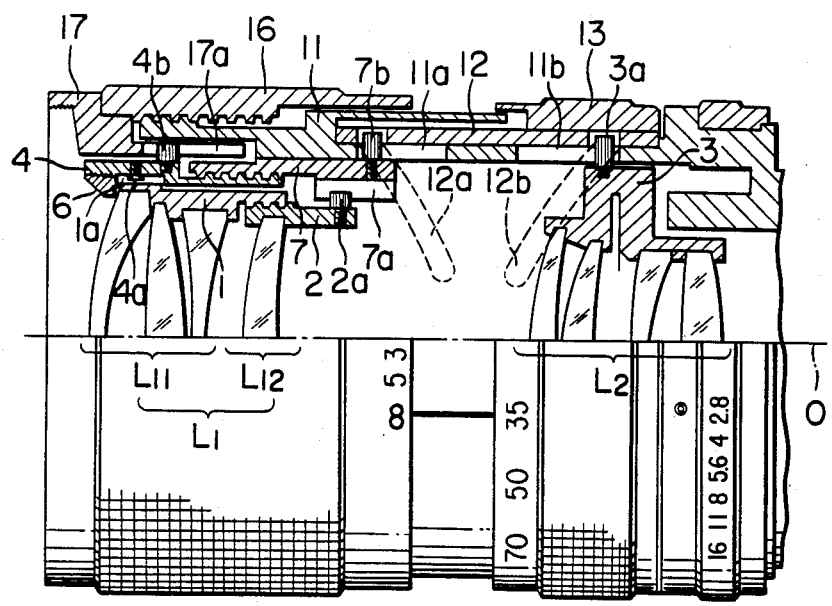

ZOOM LENS BARREL WITH SINGLE-RING CONTINUOUS FOCUSING

BACKGROUND OF THE INVENTION

1. Field of the Invention

This invention relates to a zoom lens barrel capable of proximity photography, and more particularly to a zoom lens barrel which has a lens system comprising a forward group lens and a rearward group lens and in which zooming is accomplished by moving the forward group and the rearward group lens, and focusing up to the proximity photography area is accomplished by moving only the forward group lens.

2. Description of the Prior Art

Among the conventional zoom lenses, there are those in which it is not preferable, in terms of the aberrations of the lens, to effect the distance adjustment up to proximity photography area by movement of only the forward group lens of the lens system. In most of such zoom lenses, for an object lying at an ordinary distance focusing is effected by movement of only the forward group lens, and for an object lying at a proximate position a macro mechanism for moving not only the forward group lens but also the entire zoom lens system is used. However, the macro mechanism is not only complicated in construction, but also focusing is effected at an ordinary object distance by operation of a focusing operating ring and focusing is effected at a proximate distance by operation of a macro ring. This means cumbersome of operation and lack of quickness during photography.

SUMMARY OF THE INVENTION

It is an object of the present invention to overcome the above-noted disadvantages and to provide a zoom lens barrel in which focusing can be continuously effected from infinity to proximate distance by means of a single operating ring and focusing can be effected while varying the spacing between lenses to prevent deterioration of the performance.

The invention will become fully apparent from the following detailed description of an embodiment thereof taken in conjunction with the accompanying drawing.

BRIEF DESCRIPTION OF THE DRAWING

The FIGURE of the drawing is a combined side elevation and longitudinal section view showing an embodiment of the present invention.

DESCRIPTION OF THE PREFERRED EMBODIMENT

The zoom lens shown in the drawing includes a lens system comprising a forward group lens $L_1$ and a rearward group lens $L_2$. The forward group lens $L_1$ comprises a first group $L_{11}$ and a second group $L_{12}$. For focusing, the forward group lens $L_1$ is moved in the direction of the optical axis while varying the air space between the first group lens $L_{11}$ and the second group lens $L_{12}$. Such an optical system is disclosed in U.S. Pat. No. 4,266,860.

The first group lens $L_{11}$ is held by a holding ring 1; the second group lens $L_{12}$ is held by a correcting moving ring 2 threadedly engaged with the inner side of the ring 1 by means of a helicoid; and the rearward group lens $L_2$ is held by a holding ring 3. A moving ring 4 is provided on the outer side of the ring 1. A pin 4a fitted in a straight groove 1a extending in the direction of the optical axis and formed in the ring 1 is secured to the inner peripheral surface of the ring 4. Relative displacement of the rings 1 and 4 in the direction of the optical axis and about the optical axis is impeded by mounting a nut 6 threadedly engaged with the inner surface of the ring 4 so that it bears against the end surface of the ring 1. A forward group moving ring 7 is threadedly engaged with the outer side of the ring 4 by means of a helicoid, and a pin 2a studded in the outer peripheral surface of the correcting moving ring 2 is fitted in a straight groove 7a formed in the ring 7 and extending in the direction of the optical axis.

Straight grooves 11a and 11b extending in the direction of the optical axis are formed in a fixed cylinder 11 disposed on the outer sides of the rings 3, 4 and 7, and pins 3a and 7b studded in the rings 3 and 7 extend through these straight grooves. The free ends of the pins 3a and 7b reach the interiors of cam slots 12a and 12b in a cam cylinder 12 disposed on the outer side of the fixed cylinder 11. The cam cylinder 12 is rotatable with a zooming operating ring 13 provided on the outer side of the cam cylinder.

A focusing operating ring 16 is threadedly engaged with the outer side of the forward end of the fixed cylinder 11, and a focusing transmitting ring 17 is fixed thereto. A pin 4b studded in the outer peripheral surface of the ring 4 is engaged with a straight groove 17a extending in the direction of the optical axis and formed in the ring 17.

Operation of the present embodiment will now be described.

First, when the focusing operating ring 16 is rotated during focusing, the transmitting ring 17 is rotated in the same direction and, due to the engagement between the pin 4b and the straight groove 17a, the rings 1 and 4 and nut 6 are moved in the direction of the optical axis while rotating with the transmitting ring. However, the correcting moving ring 2 cannot rotate because the pins 2a and 7b are engaged with the straight grooves 7a and 11a, respectively, and the ring 2 moves rectilinearly in the direction of the optical axis in accordance with the amount of the lead of the helicoid thread and the amount of movement of the ring 1 in the direction of the optical axis. Thus, the spacing between the lenses $L_{11}$ and $L_{12}$ is varied.

By only rotatively operating the focusing operating ring 16, focusing can be continuously effected from infinity to a macro area while preventing deterioration of the performance. Therefore, a macro mechanism, which has heretofore been used, becomes unnecessary and the entire device is made compact and the operation becomes easy.

On the other hand, when the zooming operating ring 13 is rotated during zooming, the cam cylinder 12 is rotated in the same direction as the ring 13 and, due to the engagement between the pins 3a, 7b and the cam slots 12b, 12a, the holding ring 3, namely, the rearward group lens $L_2$, is moved back and forth without rotating and at the same time, the ring 7 is moved back and forth to move the rings 1 and 4 and the nut 6 rectilinearly in the direction of the optical axis and move the lens group $L_{11}$ back and forth. At this time, the lens group $L_{12}$ is also moved back and forth with the lens group $L_{11}$.

By removing the nut 6, the rings 1 and 2 can be easily removed from the lens barrel, thus greatly facilitating the assembly and regulation of the lens barrel.

I claim:

1. A zoom lens barrel comprising:

(a) an optical system including forward lens means and rearward lens means, said forward lens means comprising first lens means and second lens means;

(b) first means for driving said forward lens means in the direction of the optical axis for focusing, said first means including an operating member, a first holding member holding said first lens means and movable in the direction of the optical axis in response to said operating member, a second holding member holding said second lens means and movable in the direction of the optical axis, and means responsive to movement of said first holding member to move said second holding member while varying the spacing between said first lens means and said second lens means; and (c) second means for driving said forward lens means and said rearward lens means in the direction of the optical axis for zooming, said second means including another operating member, a third holding member holding said rearward lens means, means responsive to said another operating member to move said first holding member and said second holding member together with each other, and means responsive to said another operating member to move said third holding member.

2. A zoom lens barrel according to claim 1, wherein said means responsive to movement of said first holding member includes means for coupling said first holding member and said second holding member together for displacement relative to each other.

3. A lens barrel comprising:

(a) an optical system including forward lens means and rearward lens means, said forward lens means comprising first lens means and second lens means;

(b) means for driving said forward lens means in the direction of the optical axis for focusing, said driving means including an operating member, a first holding member holding said first lens means and movable in the direction of the optical axis in response to said operating member, a second holding member holding said second lens means and movable in the direction of the optical axis, and means responsive to movement of said first holding member to move said second holding member while varying the spacing between said first lens means and said second lens means;

(c) said first holding member including a holding ring on which said first lens means is mounted, a ring member provided on the outer side of said holding ring for movement in the direction of the optical axis with said holding ring, and a fixed member for making said holding ring and said ring member integral with each other in the direction of the optical axis; and (d) said operating member including an operating ring provided integrally with said ring member in the direction of rotation and rotatable about the optical axis.

4. A zoom lens barrel comprising:

(a) an optical system including forward lens means and rearward lens means, said forward lens means comprising first lens means and second lens means;

(b) means for arranging the lens means of said optical system on the same optical axis and including a first holding ring for holding said first lens means, a second holding ring for holding said second lens means and a third holding ring for holding said rearward lens means;

(c) zooming drive means for moving said first and second holding rings integrally along the optical axis and moving said third holding ring along the optical axis to change the distance between said forward lens means and said rearward lens means and thus effect zooming operation;

(d) focusing drive means for moving said first and second holding rings along the optical axis to thereby effect focusing operation; and (e) the focusing drive means including means for connecting said first and second holding rings in order to produce relative displacement thereof and thereby to change the distance between said first lens means and said second lens means during the focusing operation, said connecting means including thread means for threadedly connecting said first holding ring and said second holding ring and means for providing one of said first holding ring and said second holding ring with rotation relative to the other during said focusing operation.

* * * * *